(12) United States Patent
Yang

(10) Patent No.: US 11,958,478 B2
(45) Date of Patent: Apr. 16, 2024

(54) METHOD FOR AUTOMATICALLY AVOIDING OR MITIGATING COLLISION, AND CONTROL SYSTEM, STORAGE MEDIUM AND MOTOR VEHICLE

(71) Applicant: Robert Bosch GmbH, Stuttgart (DE)

(72) Inventor: Zijian Yang, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 473 days.

(21) Appl. No.: 17/286,878

(22) PCT Filed: Oct. 24, 2019

(86) PCT No.: PCT/EP2019/078962
§ 371 (c)(1),
(2) Date: Apr. 20, 2021

(87) PCT Pub. No.: WO2020/084027
PCT Pub. Date: Apr. 30, 2020

(65) Prior Publication Data
US 2021/0347357 A1 Nov. 11, 2021

(30) Foreign Application Priority Data
Oct. 24, 2018 (CN) .......................... 201811241829.5

(51) Int. Cl.
*B60W 30/09* (2012.01)
*B60Q 1/50* (2006.01)
(Continued)

(52) U.S. Cl.
CPC ............ *B60W 30/09* (2013.01); *B60W 10/06* (2013.01); *B60W 10/10* (2013.01);
(Continued)

(58) Field of Classification Search
CPC ...... B60W 30/09; B60W 10/06; B60W 10/10; B60W 10/182; B60W 30/02; B60W 50/14;
(Continued)

(56) References Cited

U.S. PATENT DOCUMENTS 5,642,093 A * 6/1997 Kinoshita ................ B60Q 1/52
348/148
5,758,298 A * 5/1998 Guldner ............... G05D 1/0272
701/25
(Continued)

FOREIGN PATENT DOCUMENTS

EP 2990291 A2 3/2016
EP 3232286 A1 10/2017

OTHER PUBLICATIONS

International Search Report and Written Opinion for Application No. PCT/EP2019/078962 dated Feb. 24, 2020 (9 pages).

*Primary Examiner* — Jaime Figueroa
(74) *Attorney, Agent, or Firm* — Michael Best & Friedrich LLP

(57) ABSTRACT

Disclosed in the present invention is a method for automatically avoiding or mitigating a potential collision of an external moving object with a motor vehicle, the method comprising: detecting whether a potential collision of the motor vehicle with the external moving object exists under a predetermined activation condition; and if it is determined that a potential collision exists, automatically changing a movement characteristic of the motor vehicle without changing a direction currently indicated by a steering wheel when the motor vehicle meets a predetermined movement condition, in order to avoid or mitigate the occurrence of the potential collision. Also disclosed are a corresponding control system for a motor vehicle, a corresponding computer-readable storage medium and a corresponding motor (Continued)

vehicle. According to the present invention, a motor vehicle can be controlled with relative safety and stability, in order to automatically avoid or mitigate a potential collision of an external moving object with the motor vehicle.

15 Claims, 1 Drawing Sheet

(51) Int. Cl.
*B60Q 5/00* (2006.01)
*B60W 10/06* (2006.01)
*B60W 10/10* (2012.01)
*B60W 10/18* (2012.01)
*B60W 30/02* (2012.01)
*B60W 50/14* (2020.01)

(52) U.S. Cl.
CPC .......... *B60W 10/182* (2013.01); *B60W 30/02* (2013.01); *B60Q 1/525* (2013.01); *B60Q 5/006* (2013.01); *B60W 50/14* (2013.01); *B60W 2520/04* (2013.01); *B60W 2520/10* (2013.01); *B60W 2520/12* (2013.01); *B60W 2554/40* (2020.02); *B60W 2710/06* (2013.01); *B60W 2710/10* (2013.01); *B60W 2710/186* (2013.01); *B60W 2720/106* (2013.01); *B60W 2720/125* (2013.01)

(58) Field of Classification Search
CPC ......... B60W 2520/04; B60W 2520/10; B60W 2520/12; B60W 2554/40; B60W 2710/06; B60W 2710/10; B60W 2710/186; B60W 2720/106; B60W 2720/125; B60Q 1/525; B60Q 5/006
USPC ...................................................... 701/1, 26
See application file for complete search history.

(56) References Cited

U.S. PATENT DOCUMENTS

| | | | | |
|---|---|---|---|---|
| 6,405,132 B1* | 6/2002 | Breed | ..................... | G01S 19/51 701/45 |
| 8,538,674 B2* | 9/2013 | Breuer | .................. | B60W 30/09 340/436 |
| 9,079,571 B2* | 7/2015 | Trost | ......................... | B60T 7/22 |
| 9,487,212 B1* | 11/2016 | Adam | ................. | B60W 30/143 |
| 9,751,534 B2* | 9/2017 | Fung | ..................... | G06V 10/764 |
| 9,815,459 B2* | 11/2017 | Sasabuchi | ............. | B60W 30/08 |
| 9,824,585 B2* | 11/2017 | Takeuchi | .................. | B60T 7/22 |
| 9,834,211 B2* | 12/2017 | Kida | ..................... | B60W 10/18 |
| 10,068,480 B2* | 9/2018 | Matsuoka | ........ | G08G 1/096783 |
| 10,173,678 B2* | 1/2019 | Woodley | ............. | B60W 50/029 |
| 10,377,371 B2* | 8/2019 | Anderson | ............. | B60W 10/20 |
| 10,654,475 B2* | 5/2020 | Takaki | .............. | B60W 30/0956 |
| 2009/0018711 A1* | 1/2009 | Ueda | ..................... | G08G 1/166 701/1 |
| 2013/0211687 A1* | 8/2013 | Trost | ......................... | B60T 7/22 701/70 |
| 2014/0058579 A1* | 2/2014 | Ono | ......................... | G06F 17/00 701/1 |
| 2015/0120137 A1* | 4/2015 | Zeng | ..................... | B60W 30/09 701/41 |
| 2016/0001781 A1* | 1/2016 | Fung | ....................... | G07C 9/37 701/36 |
| 2016/0059853 A1* | 3/2016 | Yamakoshi | ........... | B60W 10/06 701/36 |
| 2016/0185345 A1* | 6/2016 | Sasabuchi | ............. | B60W 30/08 701/301 |
| 2016/0193971 A1* | 7/2016 | Yellambalase | ............ | B60R 1/00 348/148 |
| 2016/0193998 A1* | 7/2016 | Yellambalase | ............ | B60R 1/00 348/148 |
| 2016/0193999 A1* | 7/2016 | Sasabuchi | ................. | B60T 7/22 701/301 |
| 2016/0207531 A1* | 7/2016 | Kida | ..................... | B60W 10/18 |
| 2016/0240084 A1* | 8/2016 | Takeuchi | .................. | B60T 7/22 |
| 2017/0057505 A1* | 3/2017 | Woodley | ............... | B60W 10/06 |
| 2017/0084177 A1* | 3/2017 | Matsuoka | ............. | G08G 1/163 |
| 2017/0137023 A1* | 5/2017 | Anderson | ............. | B60W 50/14 |
| 2017/0297569 A1* | 10/2017 | Nilsson | ............. | B60W 60/0061 |
| 2017/0297570 A1* | 10/2017 | Yamakoshi | ........ | H04L 12/6418 |
| 2018/0162389 A1 | 6/2018 | Minemura | | |
| 2018/0178786 A1* | 6/2018 | Takaki | ....................... | B60R 1/00 |
| 2018/0232582 A1* | 8/2018 | Yanagawa | ............ | G06V 20/653 |
| 2019/0344790 A1* | 11/2019 | Kitagawa | ............. | G05D 1/0061 |
| 2020/0047749 A1* | 2/2020 | Morotomi | ............ | B60W 30/09 |
| 2020/0079366 A1* | 3/2020 | Higashitani | ........... | B60W 40/08 |
| 2020/0294401 A1* | 9/2020 | Kerecsen | ............ | G05D 1/0287 |

* cited by examiner

METHOD FOR AUTOMATICALLY AVOIDING OR MITIGATING COLLISION, AND CONTROL SYSTEM, STORAGE MEDIUM AND MOTOR VEHICLE

BACKGROUND OF THE INVENTION

The present invention relates to a method for automatically avoiding or mitigating a potential collision of an external moving object with a motor vehicle, a corresponding control system for a motor vehicle, a corresponding computer-readable storage medium and a corresponding motor vehicle.

At present, motor vehicles are already in wide use, having gradually entered innumerable households. Furthermore, as technology advances, motor vehicles are becoming ever more intelligent and autonomous.

As is well known, safety is of paramount importance in motor vehicles. Motor vehicle safety generally refers to a motor vehicle's performance in terms of avoiding accidents and ensuring pedestrian and passenger safety during travel, and is generally divided into active safety and passive safety. Collisions of motor vehicles with moving objects such as other travelling motor vehicles generally make up a very large proportion of road traffic accidents. Such collisions might occur even in a car park or other scenario.

However, an existing motor vehicle cannot autonomously, reliably and stably avoid or mitigate a possible collision when another motor vehicle in particular is moving towards it and thereby approaching it. Thus, there is a need for improvement.

SUMMARY OF THE INVENTION

An object of the present invention is to provide a method for automatically avoiding or mitigating a potential collision of an external moving object with a motor vehicle, a corresponding control system for a motor vehicle, a corresponding computer-readable storage medium and a corresponding motor vehicle, in order to avoid at least one of the abovementioned problems.

According to a first aspect of the present invention, a method for automatically avoiding or mitigating a potential collision of an external moving object with a motor vehicle is provided, the method comprising: detecting whether a potential collision of the motor vehicle with the external moving object exists under a predetermined activation condition; and if it is determined that a potential collision exists, automatically changing a movement characteristic of the motor vehicle without changing a direction currently indicated by a steering wheel when the motor vehicle meets a predetermined movement condition, in order to avoid or mitigate the occurrence of the potential collision.

According to a second aspect of the present invention, a control system for a motor vehicle is provided, the control system being configured to be used for executing the abovementioned method.

According to a third aspect of the present invention, a computer-readable storage medium is provided, the computer-readable storage medium storing a computer program instruction which, when executed by a processor, realizes the abovementioned method.

According to a fourth aspect of the present invention, a motor vehicle is provided, the motor vehicle comprising the abovementioned control system or the abovementioned computer-readable storage medium.

According to the present invention, a motor vehicle can be controlled with relative safety and stability, in order to automatically avoid or mitigate a potential collision of an external moving object with the motor vehicle.

BRIEF DESCRIPTION OF THE DRAWINGS

A better understanding of the principles, characteristics and advantages of the present invention can be gained below through a more detailed description of the present invention with reference to the accompanying drawings. The drawings comprise.

DETAILED DESCRIPTION

In order to clarify the technical problem to be solved by the present invention as well as the technical solution and beneficial technical effects thereof, the present invention is explained in further detail below in conjunction with the accompanying drawings and multiple demonstrative embodiments. It should be understood that the particular embodiments described here are merely intended to explain the present invention, not to limit the scope of protection thereof.

Figure 1:
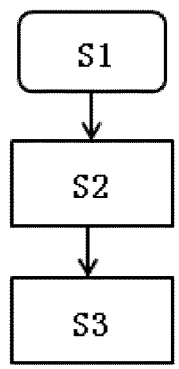
FIG. 1 shows schematically a flow chart of a method according to a demonstrative embodiment of the present invention whereby a motor vehicle automatically adopts corresponding measures with regard to a possible external object collision.

FIG. 1 shows schematically a flow chart of a method according to a demonstrative embodiment of the present invention whereby a motor vehicle automatically adopts corresponding measures with regard to a possible external object collision. The method may be configured for the motor vehicle as a function, e.g. provided as an "avoidance function". The external object may for example be another travelling vehicle.

As shown in FIG. 1, in step S1, the method is activated under a predetermined activation condition. Step S2 comprises detecting whether a situation exists whereby a moving object is moving towards the motor vehicle (also called the present vehicle hereinbelow) and there is a risk of collision. In step S3, if it is determined that a collision might occur, a corresponding component or module of the vehicle is automatically controlled without changing a direction currently indicated by a steering wheel, in order to avoid or mitigate the occurrence of a collision accident.

According to a demonstrative embodiment of the present invention, the predetermined activation condition includes a detection apparatus for detecting a moving object, in particular another vehicle, having normal function and no faults. This is because only when the detection apparatus has normal function, is it possible to correctly detect moving objects in the vicinity so that the implementation of subsequent steps is meaningful. Of course, to a person skilled in the art, the predetermined activation condition is not limited to this, e.g. the activation of this function might also require that a function of a component or module of the present vehicle that will perform control with regard to a possible collision is also normal, otherwise it will not be possible to adopt a suitable countermeasure even if it is detected that a collision might occur.

According to a demonstrative embodiment of the present invention, the detection apparatus may be radar and/or a camera. At present, radar and/or a camera is/are generally arranged at both the front and rear of a motor vehicle, and moving objects in at least the front and rear directions can thereby be detected. Preferably, the detection apparatus is configured to allow the detection of moving objects in any direction all around the present vehicle.

Those skilled in the art will understand that the question of whether a collision will occur is dependent on numerous factors, such as movement characteristics of an external object (e.g. movement direction and speed), movement characteristics of the present vehicle (e.g. movement direction and speed), distance between the external object and the present vehicle, etc. One method of determination is to predict a movement path of the external object according to the movement characteristics of the external object and predict a movement path of the present vehicle according to the movement characteristics of the present vehicle, and then determine whether a collision will occur on the basis of whether the predicted movement path of the external object and the predicted path of the present vehicle intersect: if they do intersect, then a collision will occur. For example, if the external object is moving towards the present vehicle in a straight line and the present vehicle is stationary, it can be determined that a collision will occur at a predetermined time. The present invention does not impose any restrictions on the method of determining whether a collision will occur, as long as determination is possible.

According to a demonstrative embodiment of the present invention, the abovementioned operation of detecting whether a collision will occur may be executed by means of a collision detection module, which receives a detection signal from the detection apparatus and determines whether a collision will occur on the basis of the detection signal. The collision detection module may be a program module, which may be implemented by means of a controller, e.g. an electronic control unit of the motor vehicle. Thus, the determination of whether a collision will occur may be implemented at a controller program level.

According to a demonstrative embodiment of the present invention, when it is detected that there is a risk of collision, the collision detection module sends a request signal to a control apparatus of the motor vehicle, and the control apparatus controls the corresponding component or module of the motor vehicle according to the request signal, in order to cause the motor vehicle to take a corresponding countermeasure without changing the direction currently indicated by the steering wheel, as described above.

For example, according to a demonstrative embodiment of the present invention, if the motor vehicle is stationary, then the motor vehicle control apparatus will, by controlling the corresponding component/module, automatically control the motor vehicle to cause it to move, e.g. move forwards or backwards by a certain distance to avoid or mitigate a collision. The forward or backward movement distance may be determined on the basis of the movement characteristics of the external object or the distance between the external object and the present vehicle.

Of course, the forward or backward movement distance is also restricted by numerous factors such as the distribution of obstacles in the vicinity of the present vehicle, e.g. when other vehicles are parked in front of and behind the present vehicle, the forward or backward movement distance is also restricted by the distance from the present vehicle to the vehicles in front and behind. If the vehicle in front is closer and the vehicle behind is further away, the present vehicle preferably reverses, otherwise forward movement might cause a separate collision. If the vehicle in front is further away and the vehicle behind is closer, then the present vehicle preferably moves forward. When the distances from the present vehicle to the vehicles in front and behind can both cause the present vehicle to avoid a collision, the present vehicle is preferably caused to move forward; this is because, compared with backward movement, forward movement of the motor vehicle is more acceptable to a vehicle occupant and will not cause them to panic excessively, and in addition, it is easier to control the motor vehicle.

At present, a control apparatus of a motor vehicle, comprises multiple control modules or sub-control apparatuses, for example but not limited to: a body electronic stability system (ESP), an engine start module (ESM), a transmission control unit (TCU), an electronic park brake (EPB), a body control module (BCM), an engine management system (EMS) and a braking force automatic hold module (AVH), etc. These control modules or sub-control apparatuses respectively control corresponding components of the motor vehicle to achieve corresponding control objectives. For example, a body electronic stability system helps a vehicle to maintain dynamic balance by analysing vehicle travel state information transmitted from various sensors and then sending a deviation correction instruction to an anti-lock braking system (ABS) and a drive anti-slip system (ASR).

According to a demonstrative embodiment of the present invention, when a motor vehicle is stationary, the motor vehicle is automatically caused to move a certain distance by means of a transmission control unit and an engine management system. In the case of a motor vehicle having a braking force automatic hold module and/or an electronic park brake, when the motor vehicle is stationary, the braking force automatic hold module and/or electronic park brake might be in an enabled state; at this time, in order to cause the motor vehicle to move a certain distance, it is also necessary to simultaneously release the braking force automatic hold module and/or electronic park brake automatically, so that it is possible to allow the motor vehicle to automatically move smoothly and safely.

Obviously, if the motor vehicle is not in a stationary state, but travelling, then there is no need to perform a motor vehicle starting step.

According to a demonstrative embodiment of the present invention, if the motor vehicle is travelling forwards at a speed lower than a predetermined speed such as 10 km/h, then the motor vehicle can be caused to automatically accelerate or automatically brake while maintaining the direction currently indicated by the steering wheel. This is because, when the motor vehicle is moving at a speed lower than the predetermined speed, the motor vehicle is relatively controllable and safe, and the impact of automatic acceleration and braking operations on motor vehicle safety and on a vehicle occupant is also relatively controllable. The motor vehicle can be caused to avoid a collision with an external moving object or mitigate a collision with a moving object through acceleration or braking.

Similarly, when the motor vehicle is reversing at a speed lower than a predetermined speed (which may be different from the abovementioned predetermined speed), it is theoretically also possible to cause the motor vehicle to automatically accelerate or automatically brake while maintaining the current reversing direction. However, in the case of reversing, a reversing acceleration operation might cause a vehicle occupant to feel uneasy and panicky. Thus, in the case where reversing acceleration and reversing deceleration can both avoid a collision or mitigate a collision to equal degrees, the motor vehicle is preferably caused to automatically decelerate reversing.

According to a demonstrative embodiment of the present invention, acceleration of the motor vehicle may be executed by means of an engine management system, and braking of the motor vehicle may be executed by means of a body electronic stability system.

When a possible risk of collision is detected and the motor vehicle is stationary or travelling at a speed lower than a predetermined speed, then regardless of whether the motor vehicle is caused to begin moving forwards or backwards or a current movement speed of the motor vehicle is caused to change (accelerating or decelerating), it is true in both cases that a movement characteristic of the motor vehicle is changed without changing the direction currently indicated by the steering wheel, the goal being for the motor vehicle to avoid or mitigate a collision with an external object. In the case where this goal can be achieved, the change in the movement characteristic of the motor vehicle is made as gentle as possible, so that a vehicle occupant feels better.

Although the matter of how to change a movement characteristic of the motor vehicle has been described above by taking as an example the case where the motor vehicle is caused to begin moving either forwards or backwards from stationary or to either accelerate or decelerate in a current direction of travel, to those skilled in the art the present invention is not limited to this. For example, it is also possible to dynamically adjust a movement characteristic of the motor vehicle at any time according to a change in a movement characteristic such as a movement path of an external object, e.g. possibly accelerating first and then decelerating. Thus, according to a demonstrative embodiment of the present invention, a movement characteristic of the motor vehicle is dynamically adjusted according to a movement characteristic of an external object without changing the direction currently indicated by the steering wheel.

To those skilled in the art, in addition to a movement characteristic of an external object, a change in a movement characteristic of the motor vehicle might also be restricted by other factors. For example, a change in a movement characteristic of the present vehicle must also take into account the need to avoid causing a new collision and the need to avoid violating traffic rules, etc.

According to a demonstrative embodiment of the present invention, when a movement characteristic of the motor vehicle is changed automatically in the case where a risk of collision is detected, vehicle occupants, in particular the driver, are preferably informed by means of an output apparatus, in order to mitigate their panic or unease.

According to a demonstrative embodiment of the present invention, in the case where it is impossible to avoid a collision completely, a movement characteristic of the motor vehicle may be changed according to collision loss or collision risk, etc. Specifically, in the case where a collision cannot be avoided, consideration may be given to the matter of how to control a movement characteristic of the motor vehicle in order to mitigate the collision. Collision mitigation may be characterized on the basis of property loss and personal injury caused by the collision. In other words, in the case where a collision cannot be avoided, consideration must be given to the matter of how to change a movement characteristic of the motor vehicle in order to mitigate the collision.

If the motor vehicle is moving at a speed higher than or equal to a predetermined speed such as 10 km/h, then automatically changing a movement characteristic of the motor vehicle, e.g. automatically causing the motor vehicle to accelerate or brake, might put the motor vehicle at risk of loss of control, and might also cause a vehicle occupant to be tense and frightened. Thus, in such a situation, it is preferred that a movement characteristic of the motor vehicle not be changed automatically, with only a corresponding alert apparatus being controlled instead. For example, when it is detected that there is a risk of collision behind the vehicle, a corresponding vehicle component such as a dashboard or centre console may be controlled to emit an alert sound, to remind the driver to pay attention to a possible collision, and the driver changes a movement characteristic of the motor vehicle, e.g. causes the motor vehicle to accelerate; when it is detected that there is a risk of collision in front of the vehicle, a corresponding vehicle component such as a headlight or horn may be controlled, in order to remind a moving object in front, such as a vehicle in front that is moving towards the present vehicle, to pay attention; at this time, the driver of the present vehicle may of course also change a movement characteristic of the present vehicle.

According to a demonstrative embodiment of the present invention, the triggering of a collision alert is executed by means of a body control module.

As stated above, when it is determined by means of the detection apparatus that there is a risk of collision, the control apparatus must control the motor vehicle by means of the corresponding control module or sub-control apparatus. Thus, as stated above, the execution of the avoidance operation might also require some control modules or sub-control apparatuses to have normal function and no faults; these control modules or sub-control apparatuses preferably include but are not limited to a body electronic stability system, an engine management system, a transmission control unit, an electronic park brake and a body control module. In other words, the predetermined activation condition also includes these control modules or sub-control apparatuses having normal function and no faults.

According to a demonstrative embodiment of the present invention, when the function is activated, a braking force automatic hold module automatically activates, and an uphill assist function automatically shuts down.

Figure 2:
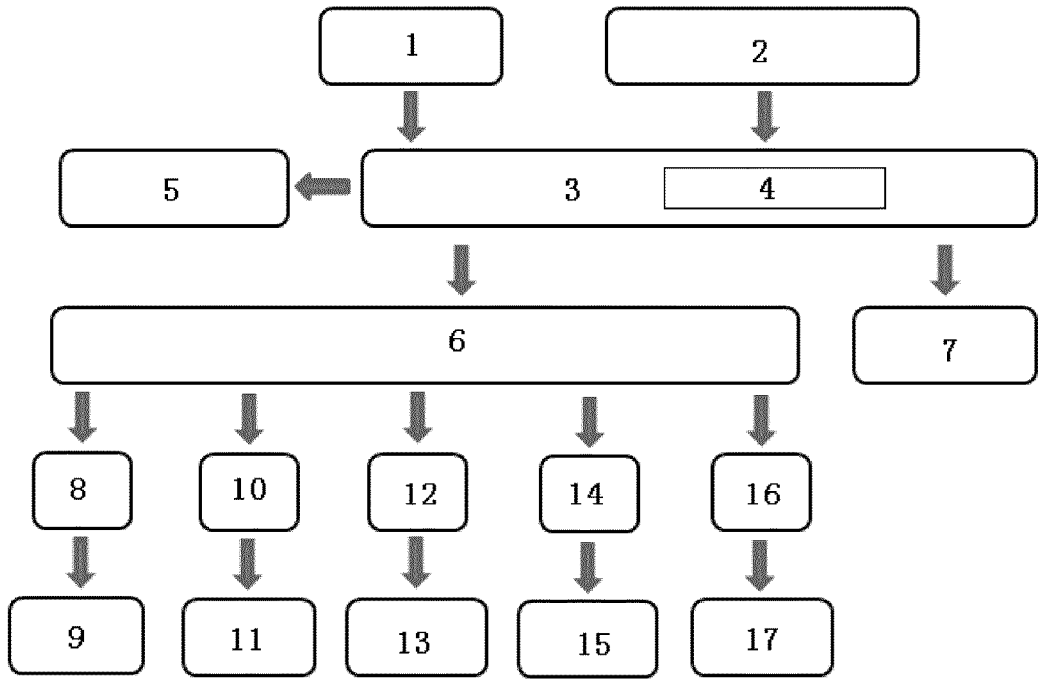
FIG. 2 shows schematically a system architecture block diagram corresponding to the abovementioned method according to a demonstrative embodiment of the present invention.

FIG. 2 shows schematically a system architecture block diagram, corresponding to the method described above, according to a demonstrative embodiment of the present invention.

As shown in FIG. 2, the function may be activated by means of a button, as shown by box 1 in FIG. 2. A detection apparatus for detecting moving objects in the vicinity is also provided, as shown by box 2 in FIG. 2. The detection apparatus sends a detection signal to a collision detection module 4 implemented in a controller program 3 for example; the collision detection module 4 analyses the detection signal received, in order to determine whether the motor vehicle will collide with a moving object; at the same time, a state of a corresponding function module is controlled as shown in box 5, e.g. causing a braking force automatic hold module to automatically activate and an uphill assist function to automatically shut down.

If the collision detection module 4 determines that there is a risk of collision, then a control request signal is sent to a control apparatus, as shown by box 6 in FIG. 2, otherwise a request signal is not sent, as shown by box 7 in FIG. 2.

The control apparatus controls a corresponding control module or sub-control apparatus to generate a corresponding control operation, according to the request signal. For example, box 8 represents an engine management system, which for example can cause the motor vehicle to automatically accelerate, as shown by box 9; box 10 represents a transmission control unit, which for example can cause the motor vehicle to automatically change gear, e.g. change to a forward gear or reverse gear, as shown by box 11; box 12 represents a body electronic stability system, which for example can cause a braking force automatic hold module to be disabled and/or perform braking intervention, as shown by box 13; box 14 represents a body control module, which for example can control headlight flashing and/or control a horn, as shown by box 15; box 16 represents an electronic park brake, which for example can release a brake, as shown by box 17.

To those skilled in the art, it is easy to understand that the method of the present invention or certain steps or processes therein may be realized via a program module, which program module may be realized via a computer-readable program medium, e.g. a readable memory, etc.

According to the present invention, the method of the present invention does not change a direction and thereby change a movement path, but instead changes a movement characteristic of the motor vehicle without changing a movement direction of the motor vehicle when the motor vehicle meets a predetermined movement condition, e.g. a movement speed of the motor vehicle being lower than a predetermined speed, in order to avoid or mitigate a collision.

To those skilled in the art, other advantages and alternative embodiments of the present invention are obvious. Thus, the present invention in a broader sense is not limited to the specific details, representative structures and demonstrative embodiments shown and described. On the contrary, those skilled in the art could make various amendments and substitutions without departing from the basic spirit and scope of the present invention.

The invention claimed is:

1. A method for automatically avoiding or mitigating a potential collision of an external moving object with a motor vehicle, the method comprising:
   detecting whether a potential collision of the motor vehicle with the external moving object exists under a predetermined activation condition; and
   when it is determined that a potential collision exists, automatically changing a movement characteristic of the motor vehicle without changing a direction currently indicated by a steering wheel when the motor vehicle meets a predetermined movement condition,
      wherein automatically changing the movement characteristic includes a first option such that the motor vehicle automatically moves forward or a second option such that the motor vehicle automatically moves backward.

2. The method according to claim 1, wherein the predetermined activation condition is that a detection apparatus for detecting the external moving object has normal function and that a motor vehicle component involved in changing the movement characteristic of the motor vehicle has normal function.

3. The method according to claim 2, wherein the motor vehicle component comprises at least one selected from the group consisting of a body electronic stability system, an engine management system, a transmission control unit, an electronic park brake and a body control module.

4. The method according to claim 1, wherein when the motor vehicle is in a stationary state, the motor vehicle is caused to automatically move a predetermined distance forwards or backwards.

5. The method according to claim 1, wherein the movement characteristic of the motor vehicle dynamically changes at least on the basis of (i) a dynamic change in a movement characteristic of the external moving object, (ii) a dynamic change in an environment of the motor vehicle, or both (i) and (ii).

6. The method according to claim 4, wherein the motor vehicle begins moving forwards or backwards from a stationary state by means of a transmission control unit and an engine management system; and/or the motor vehicle automatically accelerates by means of the engine management system; and/or the motor vehicle automatically decelerates by means of the body electronic stability system.

7. The method according to claim 1, wherein when it is determined that a potential collision exists but the motor vehicle does not meet the predetermined movement condition, then a corresponding alert is issued.

8. The method according to claim 7, wherein when it is determined that the potential collision will occur behind the motor vehicle, then an alert is issued by means of an alert apparatus in a motor vehicle cabin, in order to remind a driver.

9. The method according to claim 1, wherein in the case where a collision cannot be avoided, the movement characteristic of the motor vehicle is changed on the basis of the objective of collision mitigation.

10. A control system for a motor vehicle, wherein the control system is configured to
   detect whether a potential collision of the motor vehicle with the external moving object exists under a predetermined activation condition; and
   when it is determined that a potential collision exists, automatically change a movement characteristic of the motor vehicle without changing a direction currently indicated by a steering wheel when the motor vehicle meets a predetermined movement condition
      wherein automatically changing the movement characteristic includes a first option such that the motor vehicle automatically moves forward or a second option such that the motor vehicle automatically moves backward.

11. A non-transitory, computer-readable storage medium, containing instructions that when executed by a computer cause the computer to
   detect whether a potential collision of the motor vehicle with the external moving object exists under a predetermined activation condition; and
   when it is determined that a potential collision exists, automatically change a movement characteristic of the motor vehicle without changing a direction currently indicated by a steering wheel when the motor vehicle meets a predetermined movement condition,
      wherein automatically changing the movement characteristic includes a first option such that the motor vehicle automatically moves forward or a second option such that the motor vehicle automatically moves backward.

12. A motor vehicle, wherein the motor vehicle comprises the control system according to claim 10.

13. The method according to claim 1, wherein the predetermined movement condition is that a motor vehicle movement speed is lower than a predetermined speed.

14. The method according to claim 1, wherein when the motor vehicle meets the predetermined movement condition but is in a non-stationary state, the motor vehicle is caused to automatically accelerate or decelerate.

15. The method according to claim 7, wherein when it is determined that the potential collision will occur in front of the vehicle, then an alert is issued by means of a motor vehicle horn and/or headlight, in order to remind the external moving object in front.

\* \* \* \* \*